(12) United States Patent
Recker et al.

(10) Patent No.: US 9,233,578 B2
(45) Date of Patent: Jan. 12, 2016

(54) PNEUMATIC VEHICLE TIRE

(71) Applicant: Continental Reifen Deutschland GmbH, Hannover (DE)

(72) Inventors: Carla Recker, Hannover (DE); Marc Kreye, Braunschweig (DE); Thomas Kramer, Herford (DE); Thorsten Torbruegge, Langenhagen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 14/185,612

(22) Filed: Feb. 20, 2014

(65) Prior Publication Data
US 2014/0166181 A1 Jun. 19, 2014

Related U.S. Application Data

(63) Continuation of application No. PCT/EP2012/065086, filed on Aug. 2, 2012.

(30) Foreign Application Priority Data

Sep. 9, 2011 (DE) .......................... 10 2011 053 451

(51) Int. Cl.
| | | |
|---|---|---|
| *B60C 1/00* | (2006.01) | |
| *C08L 7/00* | (2006.01) | |
| *C08K 5/54* | (2006.01) | |
| *C08K 5/098* | (2006.01) | |
| *C08L 61/12* | (2006.01) | |

(52) U.S. Cl.
CPC .................. *B60C 1/0041* (2013.04); *C08L 7/00* (2013.01); *B60C 2009/0269* (2013.04); *C08K 5/098* (2013.01); *C08K 5/54* (2013.01); *C08L 61/12* (2013.01)

(58) Field of Classification Search
CPC ............. C08L 7/00; B60C 1/00; B60C 13/00; C08K 3/34; C08K 5/541; C07F 7/08; C08F 136/06
See application file for complete search history.

(56) References Cited

U.S. PATENT DOCUMENTS

| | | | |
|---|---|---|---|
| 5,871,597 A | 2/1999 | Vasseur | |
| 6,169,137 B1 | 1/2001 | Vasseur | |
| 6,268,424 B1 | 7/2001 | Blume et al. | |
| 6,401,781 B1 | 6/2002 | Miyazaki et al. | |
| 7,307,116 B2 | 12/2007 | Mizuno et al. | |
| 7,968,633 B2 | 6/2011 | York et al. | |
| 7,968,634 B2 | 6/2011 | York et al. | |
| 7,968,635 B2 | 6/2011 | York et al. | |
| 7,968,636 B2 | 6/2011 | York et al. | |
| 8,426,512 B2 | 4/2013 | Zhang et al. | |
| 2003/0015272 A1* | 1/2003 | Teratani et al. | ................ 152/406 |
| 2008/0142142 A1 | 6/2008 | Agostini et al. | |
| 2011/0077343 A1 | 3/2011 | Ishikawa et al. | |

FOREIGN PATENT DOCUMENTS

| | | | | |
|---|---|---|---|---|
| EP | 2 233 317 A1 | | 9/2010 | |
| WO | WO 99/09036 | * | 2/1999 | ................ C07F 7/18 |
| WO | WO 99/09036 A1 | | 2/1999 | |

OTHER PUBLICATIONS

Datta et al., "Steel Cord Adhesion," KGK Kautschuk Gummi Kunststoffe 52, Jahrgang, No. 5/99, pp. 322-328, 1999.*
International Search Report dated Dec. 20, 2012 of international application PCT/EP2012/065086 on which this application is based.
Datta R. et al, "Steel Cord Adhesion", KGK Kautschuk Gummi Kunststoffe 52, Jahrgang, No. 5/99, pp. 322 to 328, 1999.
Eisele, U. et al, "The Tear Analyzer—A New Tool for Quantitative Measurements of the Dynamic Crack Growth of Elastomers", Kautschuk + Gummi-Kunststoffe 45, Jahrgang, Nr. 12/92, pp. 1064 to 1069, 1992.
Neidermeier, W. et al, "Nano-Structure Blacks", KGK Kautschuk Gummi Kunststoffe 52, Jahrgang, No. 10/99, pp. 670 to 676, 1999.
Singh, B. et al, "Neue Haftvermittler aus vinylterminierten Carbamylmethyl-Melaminharzen", GAK 5, 1995-Jahrgang 48, pp. 536 to 541, 1995.

* cited by examiner

*Primary Examiner* — Robert Harlan
(74) *Attorney, Agent, or Firm* — Walter Ottesen P.A.

(57) ABSTRACT

A pneumatic vehicle tire has a radial carcass, a sulfur-impregnated rubber mixture which contains 70 to 100 phr (parts per weight related to 100 parts per weight of the entire types of rubber in the mixture) of natural rubber, up to 30 phr of at least one polybutadiene, up to 15 phr of at least one soot, 20 to 100 phr of at least one silica, at least one silane coupling agent and one adhesive system. In order to lengthen the service life of the pneumatic vehicle tire, the rubber mixture is the carcass rubber coating and the silica has a CTAB number according to ASTM D 3765 of more than 100 $m^2/g$.

8 Claims, No Drawings

PNEUMATIC VEHICLE TIRE

CROSS REFERENCE TO RELATED APPLICATIONS

This application is a continuation application of international patent application PCT/EP2012/065086, filed Aug. 2, 2012, designating the United States and claiming priority from German application 10 2011 053 451.2, filed Sep. 9, 2011, and the entire content of both applications is incorporated herein by reference.

FIELD OF THE INVENTION

The invention relates to a pneumatic tire which has a radial carcass and which comprises a sulfur-crosslinked rubber mixture which comprises from 70 to 100 phr (parts by weight, based on 100 parts by weight of all of the rubbers in the mixture) of natural rubber, up to 30 phr of at least one polybutadiene, up to 15 phr of at least one carbon black, from 20 to 100 phr of at least one silica, at least one silane coupling agent and an adhesive system.

BACKGROUND OF THE INVENTION

The phr (parts per hundred parts of rubber by weight) data used in this specification are the conventional quantitative data used in the rubber industry for mixture formulations. The amount added in parts by weight of the individual substances here is always based on 100 parts by weight of the entire composition of all of the rubbers present in the mixture.

Pneumatic tires are strengthened by textile or metallic reinforcement, e.g. with brass-coated steel cord, in order to withstand high mechanical stresses. Pneumatic tires comprise by way of example brass-coated steel cord in the belt, in the bead core, and optionally in the carcass. In order to ensure that the rubber-reinforcement composite is durable, the embedding rubber mixture (rubberizing mixture) is intended to exhibit good adhesion to the reinforcement, and this adhesion should not be impaired by aging and by storage in moist conditions. The vulcanizates should moreover exhibit high dynamic and mechanical strength and low susceptibility to cracking and to crack propagation.

The adhesion of rubber to textile reinforcement is achieved by way of impregnation (e.g. with resorcinol-formaldehyde resins in combination with rubber latices (RFL dip)) by the direct method using adhesive mixtures or by way of adhesive solutions of unvulcanized rubber using polyisocyanates.

The rubber-metal adhesion can be advantageously influenced by use of what are known as reinforcing resins in the rubberizing mixture. Examples of known reinforcing resins are lignin, polymer resins, and phenol-formaldehyde resins with hardener. A method that has long been known for improving the rubber-metal adhesion is to use cobalt salts and/or a resorcinol-formaldehyde-silica system, or a resorcinol-formaldehyde system as additions for the rubberizing mixtures. Rubberizing mixtures with cobalt salts and with a resorcinol-formaldehyde-silica system are known by way of example from KGK Kautschuk Gummi Kunststoffe No. 5/99, pp. 322 to 328, from GAK 8/1995, p. 536, and from U.S. Pat. No. 7,307,116.

Fillers used in known rubberizing mixtures are carbon black and/or silica in the following carbon-black-to-silica ratios: from 100:0 to 80:20, or else from 20:80 to 0:100.

Pneumatic tires comprising sulfur-crosslinked rubber mixtures are known from U.S. Pat. Nos. 5,871,592 and 6,169,137. In those documents, a mixture with natural rubber, silica, silane coupling agent and adhesive system is used as rubberizing mixture for the belt, where mixtures for rubberizing the belt are subject to quite different requirements for example in respect of heat accumulation than the requirements applicable by way of example to carcass rubber mixtures, which usually have to have high resistance to fatigue, so that in the region of the sidewall they withstand the deflection of the tire. The silica used is by way of example a high-dispersibility silica. The intention is to achieve a reduction in the rolling resistance of the tire, without any adverse effect on the other properties, such as adhesion, wear resistance, or durability in particular of the belt, or on the production of the tire. The expression high-dispersibility silica here means a silica which can break down or deagglomerate and which therefore can be dispersed (distributed) particularly well and uniformly in an elastomer matrix. This particularly good distribution can be demonstrated via electron micrographs or optical micrographs of thin sections. The silicas Ultrasil® VN2 and Ultrasil® VN3 marketed by Evonik Industries are not high-dispersibility silicas. The use of high-dispersibility silica is intended to reduce materials fatigue to a minimum in the vulcanized mixture and thus reduce the risk of separation of the mixture from reinforcement. The CTAB index of the high-dispersibility silicas used in U.S. Pat. Nos. 5,871,597 and 6,169,137 for belt mixtures is $\leq 125$ m$^2$/g.

SUMMARY OF THE INVENTION

The present invention is based on the object of providing pneumatic tires which feature a longer lifetime.

The invention achieves the object in that the rubber mixture is the carcass rubber mixture and the silica has a CTAB number above 100 m$^2$/g in accordance with ASTM D3765.

Surprisingly, it has been found that the arrangement of the rubber mixture in the form of carcass rubber mixture can effectively prevent cracking and crack growth, in particular in the region of the turned-back portion of the plies at the bead, and that the lifetime of the tire can thus be considerably improved.

The carcass rubber mixture comprises from 70 to 100 phr of natural rubber (NR), this being polyisoprene synthesized biochemically in plants having more than 99% cis-1,4 content.

The carcass rubber mixture comprises, as further rubber, up to 30 phr, preferably from 15 to 25 phr, of at least one polybutadiene (BR). For particularly good adhesion properties and good processing performance, the polybutadiene is one having more than 95% by weight cis content or is a functionalized Li-polybutadiene, e.g. BR1250 H from Nippon Zeon or the type of functionalized polybutadienes described in U.S. Pat. No. 8,426,512.

The carcass rubber mixture can comprise up to 15 phr of at least one carbon black. Accordingly, the mixture can however also be entirely free from carbon black. Types of carbon black that can be used are those conventional for rubberizing mixtures, for example carbon black of type N 326.

The carcass rubber mixture comprises from 20 to 100 phr, preferably from 40 to 80 phr, of at least one silica with a CTAB number above 100 m$^2$/g. Accordingly, it is however also possible that a plurality of the silicas are present alongside one another in the mixture.

In order to achieve a further improvement in the cracking behavior of the mixture, it has proven advantageous for the CTAB number of the silica in accordance with ASTM D3765 to be above 130 m$^2$/g, corresponding to a large specific surface area without the pores, into which cetyltrimethylammonium bromide does not pass.

In a preferred embodiment of the invention, the lifetime of the tire can be further improved by using, as silica, a high-dispersibility silica. In this application, the expression high-dispersibility silicas covers silicas which the person skilled in the art knows to be amenable to good and uniform dispersion in the elastomer matrix. They are obtainable in the market in the form of what are known as HD silicas, e.g. Ultrasil® 7000 from Evonik Industries or Zeosil® 1165 MP from Rhodia. They exhibit a markedly improved structural stability on exposure to exterior forces, and are therefore amenable to good distribution within the mixture.

In order to improve processability, and for the coupling of the silica and of other polar fillers optionally present to the diene rubber, silane coupling agents are used in the carcass rubber mixture. The silane coupling agents react with the superficial silanol groups of the silica during the mixing of the rubber or of the rubber mixture (in situ), or in the context of a pretreatment (premodification) before the addition of the filler to the rubber. Silane coupling agents that can be used here are any of the silane coupling agents known to the person skilled in the art for use in rubber mixtures. Coupling agents of this type known from the prior art are bifunctional organosilanes which have at least one alkoxy, cycloalkoxy, or phenoxy group as leaving group on the silicon atom and which have, as other functionality, a group which optionally after a cleavage process can enter into a chemical reaction with the double bonds of the polymer. The last-mentioned group can by way of example be the following chemical groups: —SCN, —SH, —NH$_2$, or —S$_X$— (where x=from 2 to 8). It is therefore possible to use, as silane coupling agents, by way of example, 3-mercaptopropyltriethoxysilane, 3-thiocyanatopropyltrimethoxysilane, or 3,3'-bis(triethoxysilylpropyl) polysulfides having from 2 to 8 sulfur atoms, for example 3,3'-bis(triethoxysilylpropyl) tetrasulfide (TESPT), the corresponding disulfide, or else a mixture of the sulfides having from 1 to 8 sulfur atoms with various contents of the various sulfides. It is also possible here by way of example to add TESPT in the form of a mixture with industrial carbon black (trade name X50S from Evonik Industries). Blocked mercaptosilanes, such as those known from WO 99/09036, can also be used as silane coupling agent. It is also possible to use silanes such as those described in U.S. Pat. Nos. 7,968,633; 7,968,636; 7,968,635; and, 7,968,634. It is possible to use by way of example silanes marketed by Momentive Performance Materials, USA, in various variants as NXT, or silanes marketed as VP Si 363 by Evonik Industries.

The carcass rubber mixture can also comprise, alongside carbon black and the high-dispersibility silicas, other fillers such as other silicas, aluminosilicates, chalk, starch, magnesium oxide, titanium oxide, or rubber gels.

The carcass rubber mixture comprises an adhesive system. Use of either an adhesive system for rubber-textile adhesion or an adhesive system for rubber-metal adhesion depends on whether the carcass rubber mixture is to be used for textile or metallic reinforcement.

In a preferred embodiment of the invention, the carcass comprises metallic reinforcement. Metallic reinforcement is used by way of example as carcass material in commercial-vehicle tires. The improvement in cracking behavior has a particularly advantageous effect in the case of metallic reinforcement, since in the event of loss of adhesion and of cracking this has increased exposure to corrosion, with resultant severe impairment of the lifetime of the pneumatic tire.

If the carcass rubber mixture is used for the rubberizing of metallic reinforcement, in particular steel cord, it is preferable to use a steel cord adhesion system based on organic cobalt salts and on reinforcing resins and more than 2.5 phr of sulfur.

The amounts usually used of the organic cobalt salts are from 0.2 to 2 phr. Examples of cobalt salts that can be used are cobalt stearate, borate, borate alkanoates, naphthenate, rhodinate, octanoate, adipate, etc. Reinforcing resins that can be used are resorcinol-formaldehyde resins, for example resorcinol-hexamethoxymethylmelamine resins (HMMM) or resorcinol-hexamethylenetetramine resins (HEXA), or modified phenolic resins, for example Alnovol® products. It is also possible to use the precondensates of the resorcinol resins.

In an advantageous embodiment of the invention, the carcass rubber mixture comprises less than 15 phr of processing aid, where this means oils and other viscosity-lowering substances. The processing aids can by way of example be plasticizer oils or plasticizer resins. It has been found that, when comparison is made with conventional mixtures, the amount of processing aids that are added to improve mixing, extrusion, and calendering of the mixture can be greatly reduced and that the mixtures of the invention nevertheless exhibit good processing performance at moderate viscosity and that the vulcanizates exhibit good dynamic-mechanical properties.

Other additional substances that can be present in the rubber mixture are conventional parts by weight of other conventional added materials such as vulcanization accelerators, vulcanization retarders, zinc oxide, and antioxidants.

The carcass rubber mixture is produced conventionally, by first generally producing a parent mixture which comprises all of the constituents with the exception of the vulcanization system (sulfur and substances affecting vulcanization), in one or more mixing stages, and then producing the finished mixture by adding the vulcanization system. The mixture is then further processed.

The carcass rubber mixture can be used to rubberize textile carcasses or metallic carcasses. However, it is preferably used to rubberize a steel cord carcass of a commercial-vehicle tire.

DESCRIPTION OF THE PREFERRED EMBODIMENTS OF THE INVENTION

The invention will now be explained in more detail with reference to comparative and inventive examples collated in Table 1.

In all of the mixture examples in the tables, the stated quantitative data are parts by weight based on 100 parts by weight of all of the rubbers present (phr). The comparative mixtures are designated comp and the carcass rubber mixture of the invention is denoted by I. The mixture comp(1) is a carcass rubber mixture for steel carcasses based on a carbon black/silica blend with low silica content; the mixture comp (2) is a purely carbon-black-containing carcass rubber mixture for steel carcasses. In contrast, the mixture I(3) comprises only Ultrasil® VN3 silica in an amount of 55 phr. The mixture I(4) comprises an amount of 60 phr of Zeosil® 1165 MP high-dispersibility silica. The amounts of sulfur and accelerator in the mixtures were adjusted in such a way that the mixtures have a comparable 300% modulus.

Mixture production took place under conventional conditions in a plurality of stages in a laboratory tangential mixer. Test specimens were produced from all of the mixtures by 20 minutes of vulcanization under pressure at 160° C., and the test specimens were used in the test methods stated below to determine typical rubber-industry properties of the materials.

Shore A hardness at room temperature in accordance with DIN 53 505

Rebound resilience at room temperature and 70° C. in accordance with DIN 53 512

Tensile strength at room temperature in accordance with DIN 53 504

Elongation at break at room temperature in accordance with DIN 53 504

Modulus at 50 and 300% elongation at room temperature in accordance with DIN 53 504

Fracture energy density determined in the tensile test in accordance with DIN 53 504, where the fracture energy density is the required fracture energy divided by the volume of the specimen Loss factor tan $\delta_{max}$ at 55° C. as maximal value over the elongation sweep from dynamic-mechanical measurement in accordance with DIN 53 513

The mixtures were also characterized in relation to their dynamic durability with the aid of a "tear fatigue analyzer" (TFA). Typical test procedures are described by way of example in Kautschuk Gummi Kunststoffe 45 (12), 1064 ff (1992). The present results were achieved with a pulse loading of 30/5 Hz and with dynamic elongations of from 5 to 8%. The evaluation determined the possible energy introduced for a lifetime of 100 kcycles.

Tests for fatigue-crack resistance were also carried out, based on the number of load cycles prior to fracture of a dumbbell specimen subjected to a continuously repeating elongation cycle at a frequency of 104±8 min$^{-1}$, determined by a Monsanto Fatigue to Failure Tester (abbreviated to: FTF) for 68% elongation at 23° C.

315/70 R22.5 commercial-vehicle tires with a steel carcass were moreover provided with the mixtures comp(1), comp(2) and I(3) as rubberizing mixture for the carcass, and tire durability was tested at a constant ambient temperature of 38° C. on an in-house test rig. The typical test procedure includes a load increase in stages until the tire fails.

TABLE 1

| | Unit | comp(1) | comp(2) | I(3) | I(4) |
|---|---|---|---|---|---|
| Constituents | | | | | |
| Natural rubber | phr | 100 | 100 | 80 | 80 |
| Polybutadiene[a] | phr | — | — | 20 | 20 |
| N 326 carbon black | phr | 51 | 60 | — | — |
| Silica A[b] | phr | 8 | — | 55 | — |
| Silica B[c] | phr | — | — | — | 60 |
| Silane coupling agent[d] | phr | — | — | 8.5 | 9.3 |
| Processing aid | phr | 7 | 5 | 5 | 5 |
| Antioxidant | phr | 2 | 1.8 | 4 | 4 |
| Organic cobalt salt | phr | 1.3 | 0.5 | 0.4 | 0.4 |
| Resin made of resorcinol and formaldehyde donor | phr | 2.6 | 4.6 | 5 | 5 |
| Zinc oxide | phr | 8 | 9.5 | 8 | 8 |
| Accelerator | phr | 1.6 | 1 | 1.4 | 1.5 |
| Sulfur | phr | 5.5 | 4.4 | 4.0 | 4.3 |
| Properties | | | | | |
| Shore A hardness at RT | Shore A | 73 | 72 | 74 | 78 |
| Rebound resilience at RT | % | 44 | 42 | 45 | 41 |
| Rebound resilience at 70° C. | % | 60 | 62 | 56 | 53 |
| Tensile strength at RT | MPa | 20 | 20 | 23 | 22 |
| Elongation at break at RT | % | 387 | 384 | 538 | 495 |
| 50% modulus | MPa | 1.9 | 1.7 | 1.9 | 2.3 |
| 300% modulus | MPa | 17.8 | 15.9 | 12.6 | 13.4 |
| Fracture energy density | J/cm$^3$ | 27 | 36 | 51 | 45 |
| tan $\delta_{max}$ at 55° C. | — | 0.138 | 0.142 | 0.142 | 0.154 |
| TFA energy for 100 kcycles | kPa | 61 | 145 | 150 | 165 |
| FTF energy for 68% elongation | kcycles | 120 | 207 | 384 | >400 |
| Drum running time to failure | h | 190 | 223 | 258 | 263 |

[a]high-cis polybutadiene
[b]Ultrasil ® VN3, CTAB index = 165 m$^2$/g, Evonik Industries, Germany
[c]Zeosil ® 1165 MP, CTAB index = 155 m$^2$/g, Rhodia, Germany
[d]Silane coupling agent on carbon black in a ratio by weight of 1:1, X 50 S ®, Evonik Industries, Germany From the values for cracking and for crack growth, for adhesion, and for drum running time it can be seen that when the mixture is used as carcass rubber mixture it is possible to achieve a markedly longer tire lifetime. Still better results are achieved with a high-dispersibility silica with a CTAB number of 155 m$^2$/g.

It is understood that the foregoing description is that of the preferred embodiments of the invention and that various changes and modifications may be made thereto without departing from the spirit and scope of the invention as defined in the appended claims.

What is claimed is:

1. A pneumatic tire having a radial carcass made from a sulfur-crosslinked rubber mixture which comprises:
   from 70 to 100 phr (parts by weight, based on 100 parts by weight of all of the rubbers in the mixture) of natural rubber;
   from 0 to 30 phr of at least one polybutadiene;
   from 0 to 15 phr of at least one carbon black;
   from 20 to 100 phr of at least one silica;
   at least one silane coupling agent; and,
   an adhesive system,
   wherein the rubber mixture is a carcass rubber mixture and the silica has a CTAB number above 100 m$^2$/g in accordance with ASTM D3765; and,
   wherein the rubber mixture comprises less than 15 phr of processing aid.

2. The pneumatic tire as claimed in claim 1, wherein the at least one polybutadiene is selected from the group consisting of a polybutadiene having more than 95% by weight cis content and a functionalized Li-polybutadiene.

3. The pneumatic tire as claimed in claim 1, wherein the rubber mixture comprises from 40 to 80 phr of the at least one silica.

4. The pneumatic tire as claimed in claim 1, wherein the at least one silica has a CTAB number above 130 m$^2$/g in accordance with ASTM D3765.

5. The pneumatic tire as claimed in claim 1, wherein the at least one silica is a high-dispersibility silica.

6. The pneumatic tire as claimed in claim 1, wherein the radial carcass comprises metallic reinforcement.

7. The pneumatic tire as claimed in claim 6, wherein the adhesive system is a steel cord adhesive system comprising an organic cobalt salt, a reinforcing resin, and more than 2.5 phr of sulfur.

8. The pneumatic tire as claimed in claim 1, wherein the pneumatic tire is a commercial-vehicle tire.

* * * * *